United States Patent [19]

Takashi et al.

[11] 4,075,050

[45] * Feb. 21, 1978

[54] METHOD OF MAKING SYNTHETIC PAPER

[75] Inventors: Masanori Takashi, Ami; Mitsuo Yoshiyasu, Ibaraki, both of Japan

[73] Assignee: Mitsubishi Petrochemical Company Limited, Japan

[*] Notice: The portion of the term of this patent subsequent to Mar. 26, 1991, has been disclaimed.

[21] Appl. No.: 641,820

[22] Filed: Dec. 17, 1975

Related U.S. Application Data

[60] Continuation of Ser. No. 349,961, April 11, 1973, abandoned, which is a division of Ser. No. 197,757, Nov. 11, 1971, abandoned, which is a continuation-in-part of Ser. No. 809,629, March 21, 1969, abandoned.

[30] Foreign Application Priority Data

Mar. 26, 1968 Japan .................................. 43-19204

[51] Int. Cl.$^2$ ............................................. B29C 17/02
[52] U.S. Cl. ..................................... 156/229; 156/272; 156/324; 428/308; 428/309; 428/DIG. 910
[58] Field of Search ............... 156/229, 272, 324, 244, 156/163; 428/307, 309, DIG. 910, 304, 308, 306; 264/288, 289, 340, DIG. 73; 427/13

[56] References Cited

U.S. PATENT DOCUMENTS

| | | | |
|---|---|---|---|
| 3,281,347 | 10/1966 | Winder ................................. | 156/274 |
| 3,503,842 | 3/1970 | Kahn .................................... | 156/229 |
| 3,515,625 | 6/1970 | Sedlak et al. ........................ | 428/309 |
| 3,515,626 | 6/1970 | Duffield et al. ...................... | 156/229 |
| 3,669,728 | 6/1972 | Semer .................................. | 428/307 |
| 3,799,828 | 3/1974 | Takashi et al. ...................... | 156/229 |

Primary Examiner—Charles E. Van Horn
Assistant Examiner—Jerome W. Massie

Attorney, Agent, or Firm—Robert E. Burns; Emmanuel J. Lobato; Bruce L. Adams

[57] ABSTRACT

A laminated structure forming a synthetic paper made of a base or backing film layer made of a thermoplastic resin in a biaxially oriented state. A paper-like film layer is laminated to the base film layer and comprises a thermoplastic resin having 0.5 to 65% by weight of particles of a fine, inorganic filler dispersed in the resin thereof substantially uniformly. The paper-like film layer is in an uniaxially oriented state and has microvoids dispersed therein formed by stretching the laminated films in a heated state. The microvoids comprise microvoids open to a surface of the paper-like film layer free of the base film layer and include microvoids, open and closed, distributed in the paper-like film layer defining therein a cellular, fibrous structure. The two films are formed from thermoplastic resinous compositions in which the components of each composition are well admixed and particles of a fine filler are uniformly distributed in the thermoplastic resin of the paper-like film layer to obtain, as much as possible, microvoids distributed therein uniformly. After the base film layer is formed, it is stretched in a heated state in a machine for longitudinal direction to orient the film uniaxially. The paper-like layer is laminated under pressure on one surface of the base film layer while in a melted state and the resulting laminated structure is stretched transversely to at least 2.5 times the original transverse dimension of the portion of film being stretched between grippers of a stretching machine. This orients the base film layer biaxially and the paper-like film layer uniaxially. The stretching must be sufficient for the stretching and particles of filler to develop microvoids in the paper-like film layer rendering it a cellular and fibrous structure.

4 Claims, 11 Drawing Figures

METHOD OF MAKING SYNTHETIC PAPER

This application is a continuation of application Ser. No. 349,961, filed Apr. 11, 1973, now abandoned; which is a division of application Ser. No. 197,757, filed Nov. 11, 1971, now abandoned; which is continuation-in-part of application Ser. No. 809,629, filed Mar. 21, 1969, now abandoned.

BACKGROUND OF THE INVENTION

This invention relates generally to a laminated structure made of a multiplicity of laminated films and more particularly to a synthetic paper and the method of making the same.

DESCRIPTION OF THE PRIOR ART

The term synthetic paper as used herein refers to a paper-like laminar structure made in the form of thin sheets or films of synthetic resinous material employed for various uses, such as writing and printing, as distinguished from natural cellulose paper.

Synthetic papers made of thermoplastic resin or papers coated with polymeric emulsions are known for use in writing, printing and the usual uses to which natural cellulose paper is used. Moreover, it is known to orient thermoplastic film laminated structures under elevated temperature conditions in a transverse direction to form homogeneous oriented film products having excellent physical and optical properties, such as are shown in U.S. Pat. No. 3,380,868. Polymeric film structures having a matte-finish and a cellular structure are also known. The finish is produced in these films by a filler which roughens the surface upon stretching of the film and renders the film receptive to marking by such instruments as a pencil, crayon, ball point pen and the like. Typical of these films is the film disclosed in U.S. Pat. 3,154,461. Laminates comprising layers of oriented films of thermoplastic materials in which at least one of the outermost layers of film contains a suitable inert additive are also known. The laminates of this type are particularly of use as films which may be written on by a pencil or crayon. Laminates of this type are disclosed in U.S. Pat. No. 3,515, 626.

In the known oriented films composed of thermoplastic materials and laminates thereof no attempt has been made to develop microvoids therein open to the surface of the film for better adherence of ink or printing materials thereon nor a distribution of the microvoids providing a cellular, fibrous structure in a paper-like film layer, nor such a distribution of voids relative to the whole paper-like film that the feel of cellulose paper of the same thickness is imparted thereto, having a specific gravity less than a pulp cellulose paper, improved reception as to ink, improved printability, opacity and strength relative to the known cellulose pulp paper.

SUMMARY OF THE INVENTION

It is a principal object of this invention to provide a synthetic paper or paper-like laminate structure, in the form of sheets of film, which has a specific gravity less than natural cellulose paper and improved receptivity to ink, improved printability, opacity and strength.

Another object is to provide a new and improved synthetic paper which has no fly ash when burned and low calorific content thereby reducing pollution.

Still another object is to provide a synthetic paper from which paper products such as writing paper, envelopes, bags, cups, wrappers and the like can be constructed.

Another object is to provide a strong synthetic paper that has excellent folding endurance in that it may be folded and unfolded along a fold thousands of times without degradation and rupture.

Another object is to provide a synthetic paper that has greater tensile strength and burst strength than natural cellulose paper of the same thickness as well as known synthetic papers.

Still another object of the present invention is to provide a synthetic paper that has excellent waterproof qualities and dimensional stability once subjected to humidity.

Another object is to provide a new and improved method of producing a new and improved synthetic paper.

The synthetic paper according to the invention comprises, a laminated film structure having a base film layer and a paper-like film layer laminated thereto. The base film layer is a film made of a thermoplastic resin which may have 0 to 20% by weight of a fine inorganic filler dispersed in the resin and is in a biaxially oriented state. The paper-like film layer is likewise made of a thermoplastic resin having 0.5 to 65% by weight of a fine inorganic filler dispersed in the resin thereof substantially uniformly and is in an uniaxially oriented state. Microvoids are formed on and in the paper-like film layer and dispersed therein such that open cells or microvoids open to a surface thereof free of the base film layer and elongated microvoids are distributed in the paper-like film layer with fibrous-like portions of the resin among the microvoids to define a cellular, fibrous structure.

The method according to the invention provides for admixing the constituents for making a base film layer principally constituting a thermoplastic resin which may or may not be provided with a filler. The composition is formed into a base film and uniaxially oriented in a machine or longitudinal direction. A second thermoplastic film layer comprising therein 0.5 to 65% by weight particles of a fine, inorganic filler dispersed uniformly in the resin thereof substantially uniformly is laminated onto the base film layer and the resulting laminated structure is uniaxially oriented in a transverse direction so that the base film layer is biaxially oriented and the second film layer is in a uniaxially oriented state. The stretching is at least 2.5 times the original dimension of the transverse portion of the laminated structure being stretched so that the stretching in conjunction with the particles of fine filler develops within this second film layer microvoids, open to a surface thereof free from the base film and distributed in the resin to define therein a cellular, fibrous structure so that the second film becomes a paper-like film layer and the resulting laminate is a sheet of synthetic paper-like material or synthetic paper usable for writing or printing thereon with known instrumentalities and for making products of a type made from cellulose paper. The microvoids are at least 10% of the whole of the volume of the paper-like sheet or film and preferably should not exceed 65%.

BRIEF DESCRIPTION OF THE DRAWINGS

Other features and advantages of a paper-like laminated structure or synthetic paper according to the invention will be better understood in conjunction with the specification and appended claims and the drawings in which:

DESCRIPTION OF THE PREFERRED EMBODIMENTS

Figure 1:
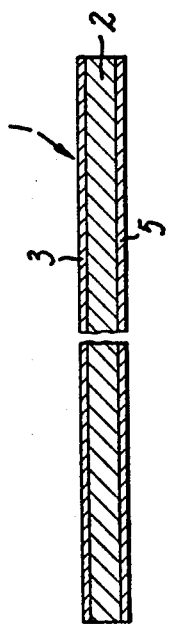
FIG. 1 is a cross-section view diagrammatically illustrating a synthetic paper according to the invention.

The synthetic paper according to the invention is constructed as a miltiple-layer or multi-layer sheet laminate 1, comprising a base film layer 2 made of a thermoplastic resin on a surface of which is adhered or laminated thereon a paper-like film layer 3 made of a thermoplastic resin mixed with particles of a fine inorganic filler within a range of 0.5 to 65% by weight. The synthetic paper may be made solely of the two layers described and may include a second paper-like film layer 5 adhered to or laminated to the base film layer on an opposite surface to that to which the first paper-like film layer 3 is adhered.

The base film layer 2 imparts the physical strength characteristics of the synthetic paper according to the invention as herein described. The paper-like film layers 3,5 provide improved surfaces on which writing and printing may be accomplished with the known writing and printing instrumentalities as hereinafter described.

The base film layer 2 and paper-like film layer 3 are formed from compositions which are later herein described in detail. The base film layer thermoplastic resin, with whatever additives have been added thereto, is fomed by an extruder 7 which is of a single screw type having an L/D ratio over twenty-eight. The extrusion of the film 2 is through a film-forming die 8 having a uniformity index over 0.9. The film 2 is delivered longitudinally over a set of rolls 10, 11 and passes through the nip of the rolls where its uniformity of thickness is maintained at a desired thickness as hereinafter disclosed. The film is delivered over guide rolls 12,13 to a longitudinal stretching zone or machine 15 which uniaxially orients the film in the longitudinal or machine direction. The film passes over a heating roll 15a, or it may be otherwise heated by infra red heating devices, not shown. The heated thermoplastic film is stretched by two stretching rolls 15b, 15c. The film is stretched at least 1.3 times its longitudinal dimension to orient the thermoplastic resin therein and improve the physical strength characteristics of the film that will become the base layer film 2. The stretched film is cooled by a cooling roll 15d. The uniaxially oriented base layer film is advanced longitudinally over guide rolls 17,18 to a set of laminating rolls 20,21 where it is laminated to a second thermoplastic film, which will become the film layer 3 described hereinafter as to composition and characteristics, extruded by a film-forming extruder 23 which is diagrammatically illustrated and is a vent-type extruder having an L/D ratio on the order of the first described extruder and a die with a similar uniformity index. The laminating takes place in the nip of the laminating rolls 20,21 at a pressure avoiding the formation of undulations in the surface of the films while maintaining pressure sufficient to obtain a strong bond between the two laminated film layers 2,3.

The double film or two-layer laminate is advanced longitudinally over guide rolls 25,26,27 and is advanced to a second set of laminating rolls 30,31 adjacent which is disposed a third extruder 33 of the same type as the second extruder 23 delivering a thermoplastic resin film, constituting the third film layer 5, laminated under pressure to a surface of the base film opposite to the first lamination of the first film thereon. The three-ply laminate 1 is advanced longitudinally over guide rolls 35,36,37 as illustrated where cooling takes place and is advanced to a second stretching apparatus 39 divided into three zones. A first zone is a pre-heating zone where the three-layer laminate is heated, for example, with hot air heating devices, to a temperature in the order of 140° to about 180° C. and is then stretched in a transverse direction at least in the order of 2.5 times the original dimensions of the portions of the laminate between the stretching grippers of a stretching device in the second or stretching zone. The laminate is advanced from the stretching zone to a third zone or setting zone in which the laminate is reduced in temperature to about 120° to 160° C. The temperature of the laminate in the stretching zone is in the order of 140° to 170° C.

The set laminate 1 may then be delivered to a take-up apparatus, however, the method of the invention provides for a surface treatment to improve the adherence of ink to the two outermost film layers 3,5 by polarizing the two outermost films. It has been found that the adherence of ink can be improved by applying to the surface of the outermost film layers a corona discharge treatment accomplished by electrodes 41,42 on opposite sides of the laminate to which a voltage of 3000 to 30,000 volts is applied with a plate current of 0.5 to 5 amperes. Treatment is accomplished by maintaining the clearance between the laminate and the electrodes 41,42 constant. Accordingly stabilizing rolls 44,45 maintain the film laminate 1 and electrode clearance accurately, it being understood that the electrodes are disposed immediately adjacent to the stabilizing rolls downstream thereof and extend transversely of the film laminate 1.

The invention provides for a composition of the outermost layers of the laminate to provide paper-like layers on which writing and printing can take place with known instrumentalities. The composition of the paper-like layers is described hereinafter, however the composition of the thermoplastic resin with the controlled filler content and minimum size of filler particles constituting 0.3 microns and the uniform distribution of the filler provides a composition in which microvoids can be controllably developed by the transverse stretching of the laminate. The microvoid formation is a function of the size of filler particles, the extent of stretching, and the filler content which is in the order of 0.5% to 65% by weight preferably in the order of 20% by weight and more particularly 25% by weight of the whole of the composition from which the paper-like layers 3,5 are formed.

Figure 3:
FIG. 3 is a plan view of a photomicrograph of a paper-like layer of synthetic paper according to the invention.
Figure 4:
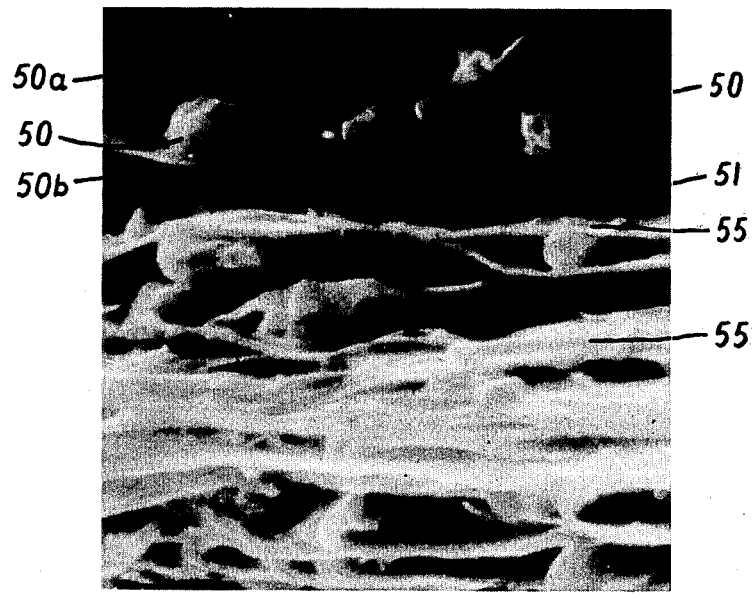
FIG. 4 is a longitudinal section view of a photomicrograph of the paper in FIG. 3.

The stretching of the laminate 1 must be sufficient to develop an internal mechanism within the outermost films during the stretching in which inorganic filler particles 50, in each of the outermost film layers 3,5 coact with the stretching to develop microvoids 51 in the film layers. The transverse stretching must be at least 2.5 times the original dimension as before described. Stretching of seven times the dimension and even higher, for example, up to sixteen times, has yielded suitable voids. Thus as the stretching takes place, stresses develop about the uniformly dispersed filler particles 50 and microvoids or cells 51 are developed. Some cells 52 are formed next adjacent to the surface of the outermost films 3,5 free of the base film layer 2. These cells or voids 52 are open to the surface and in communication therewith as illustrated in FIG. 3. The transverse orientation of the paper-like layers or films 3,5 results in formation of microvoids 51 internally of the film structure as illustrated in FIG. 4. The distribution of the internal microvoids 51 is such that portions 55 of the resin among the microvoids are fibrous in structure as clearly shown in FIG. 4. The internal cells or microvoids 51 may be independent, and some will communicate with others. Generally each microvoid 51 has internally thereof a filler particle 50 effecting the formation of a microvoid. The filler particles generally are in contact with two opposite sides or boundaries 50a,50b of the resin within which the microvoid is formed as is clearly seen in FIG. 4. The microvoids 52 on the surface of the paper-like film layers 3,5 provide the synthetic paper or laminate with a better receptiveness to ink than other synthetic paper or film. The surface likewise has the "feel" of natural cellulose papers, and the surface is improved for writing thereon with known instrumentalities such as a pencil, crayon, ball point pen and the like.

Figure 5:
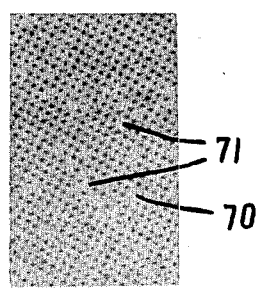
FIG. 5 is a plan view of a photomicrograph of a printed sheet of plastic synthetic paper according to the prior art.
Figure 6:
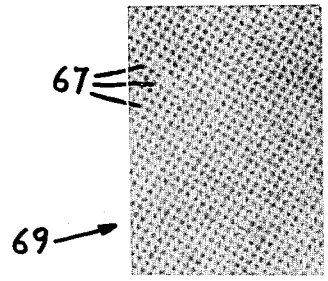
FIG. 6 is a plan view of a photomicrograph of a printed sheet of paper according to the invention.

The microvoids 51 formed interiorily of the outermost film layers reduce the density and specific gravity of these layers so that the resulting laminate or synthetic paper 1 is much lighter than known synthetic writing films and papers including coated natural cellulose papers and art paper. The fibrous, cellular structure of the outer films 3,5 provides a cushionability improving the printing and ink transfer during printing with the known techniques. Accordingly the ink transfer to the surface on the printed areas is substantially uniform as illustrated in FIG. 5 as compared with known plastic coated paper as illustrated in FIG. 6 and other synthetic films and papers.

The microvoid formation and particularly the surface microvoids improve the light reflective characteristics of the synthetic paper according to the invention so that the whiteness and opacity is better than that of natural cellulose papers and synthetic films and papers. The improved whiteness and opacity improves the ability of reproducing the desired printed image.

These improved characteristics in conjunction with the improved cushionability and ink receptiveness result in the improved printing and the quality thereof mentioned heretofore. The ink dots 67 of the printing on a printed paper 69 according to the invention are distributed uniformly on the surface and spaces or gaps, of the type shown at 70,71 on a known coated paper in FIG. 6, are avoided. The uniformity of the printing assists in the reproduction of the desired image.

The reduced density and cellular structure throughout the synthetic paper 1 improves its anti-pollution characteristic in that there is a reduction in solid matter and the voids provide spaces and areas readily accessible to air so the paper will burn more readily with less release of heat and less calorific value. The synthetic paper 1 will burn without smoke and fly ash in that complete combustion takes paper and the ashes remain in the container within which the burning takes place.

The base film layer 2 is principally a thermoplastic resin. Specifically polyolefin resins such as homopolymers and copolymers of, for example, ethylene, propylene and butene-1, polyamide resins; polyester resin such as polyethylene terephthalate polyvinyl resin such as homopolymers and copolymers of vinyl chloride; and polyvinylidene resins such as homopolymers and copolymers of vinylidene chloride and homopolymers and copolymers of styrene can be used singly or as a mixture thereof. Moreover, auxiliary materials such as a stabilizer, plasticizer, filler and pigment may be contained in the base film layer material resin within its stretching range as necessary. When less than 20% by weight of a filler is blended into the base layer film resin some favorable results can be obtained. These results are an improved whiteness, opacity, stiffness and toughness of the resulting synthetic paper. Moreover, the surface of the base film layer 2 becomes coarse and adhesion of the other two films thereto is greatly improved.

An orientable thermoplastic resin is used for the paper-like film layers 3,5 and may be the same or a different resin selected from the group of the above-mentioned resins used in the base film layer. When a heat sealing characteristic is desired, the softening point of the paper-like film layer must be less than that of the base film layer resin. For example, in the event that the base film layer is made of a homopolymer, and the paper-like film layer is made of a copolymer containing a monomer which is a component unit of the homopolymer, in the base film layer the resulting paper-like layer will have a lower softening point than that of the base layer. Under these conditions a favorable heat sealing characteristic can be developed in the paper and heat sealing can be carried out free from shrinkage of the base film layer.

The selection of the resins must be such that the resins in the different layers have a sufficient adhesiveness with respect to the base film layer so that lamination can be carried out effectively. The use of a filler in the base film layer develops microvoids on the surface thereof improving the adhesion of the paper-like layers thereto. Moreover, an anchor coat can be applied to the base film layer to improve the adhesion of the laminate film layers, for example using a polyisocyanate or a polytitanate. The resin for the paper-like layer may also contain suitable auxiliary materials as in the case of the base layer resin.

The paper-like film layer resin contains particles of a fine inorganic filler as listed hereinafter. Care must be taken in selecting the filler so that it is a filler which does not discolor due to decomposition at elevated temperatures which are applied in the course of making the synthetic paper according to the invention. Examples of suitable inorganic fillers for the paper-like film layers are: clay, talc, asbestos, gypsum, barium sulfate, calcium carbonate, magnesium oxide, diatomaceous earth and silicon oxide particles used either singly or as a mixture of two or more of these fillers. The filler must be fine filler, for example, of a grain size of approximately 0.5 – 30 microns but the particles should be no less than 0.3 microns in order to develop the microvoids as heretofore described. The paper-like film layers contain 0.5% to 65% and preferably 5% to 60% by weight of a fine inorganic filler in the component materials.

As heretofore explained the addition of the inorganic filler in the formation of microvoids and accordingly the lightness, stiffness and toughness of the paper-like layer are greatly improved. The printability, whiteness and the feel of the overall paper are improved because of generation of voids.

Figure 2:
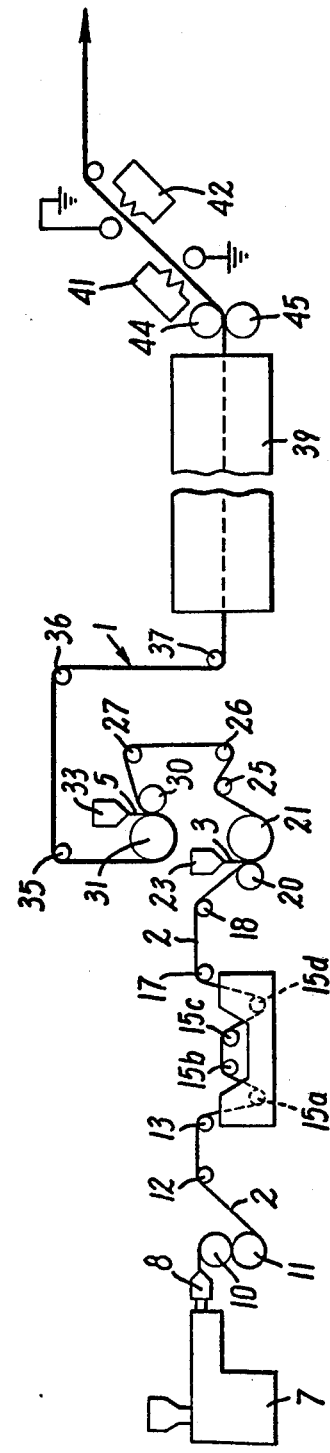
FIG. 2 is an elevation view of a diagram of an apparatus for manufacturing the synthetic paper in FIG. 1.

The resin of the paper-like film layers is prepared for delivery to the film-forming extruders 23,33 by taking 100 parts of the resin and separating it into two batches. A batch of 90 parts of the resin has the filler to be added thereto, for example, constituting in the order of 20 parts. A master small batch of resin is prepared which constitutes 10 parts of the original 100 parts of the resin to which are added an antistatic agent, the stabilizer as hereinafter described and a dispersing agent in small amounts, for example, in the order of 0.3 to 1 percent. The dispersing agent assists in obtaining a uniform distribution of the inorganic filler particles. The two separate batches are independently mixed in a Henshel mixer and after mixing of the batches the two batches are then mixed together in a Henshel mixer. The resulting mixture of the two batches is then delivered to a twin screw extruder in order to improve the uniformity of the mixture and the uniformity of distribution of the inorganic filler throughout the composition. The output from the twin screw mixer is the starting material or product pellets which are delivered to the film-forming extruders 23,33 heretofore described with respect to FIG. 2.

The composition used for making the base film layer is treated similarly to the preliminary steps defined heretofore with respect to the mixing and extruding of the paper-like film layers. However, in the event that the filler is of a small amount, for example, 3% to 5% by weight, the materials are mixed in a single batch in a Henshel mixer and then delivered to a twin screw extruder where it is pelletized and the starting material for the film-forming extruder 7 is thus made.

Figure 7:
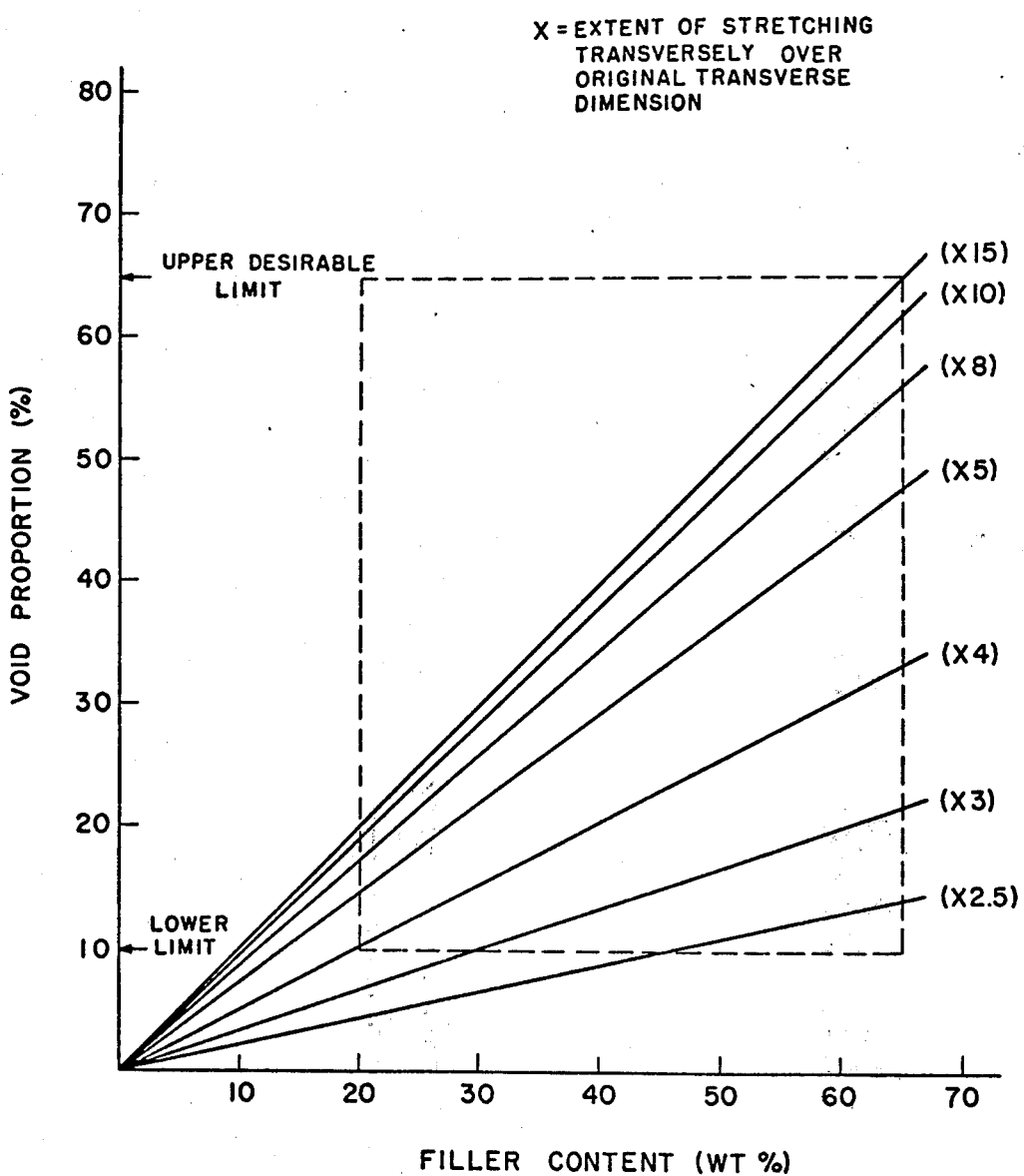
FIG. 7 is a diagram or plot illustrating the percentage of voids as related to the stretching operation.

The relation or ratio between stretching and void formation is illustrated in the graph in FIG. 7. The graph illustrates curves indicating that the stretching and the filler content control the ratio of voids to the whole of the individual paper-like film layers. The range of the curves illustrate that transverse stretching of at least 2.5 times (X 2.5 as shown) will form voids and that the stretching can exceed 15.0 times (X15) the original transverse dimension.

The following lists and tables set forth examples of the components used in preparing the several film layers and the ratios and manufacturing conditions:

RESINS

PP; Polypropylene
PE; Polyethylene
EVA; Ethylene-vinyl
EPP; Ethylene-propylene-copolymer
PVC; Polyvinyl chloride
PVDC; Polyvinylidene chloride
PS; Polystyrene
HI/PS; High impact polystyrene
ABS; Acrylonitrile butadiene styrene copolymer

FILLERS

Kieselguhr, clay, Ca-carbonate, $TiO_2$, Barium sulfate, Magnesium oxide.

STABILIZERS

Calcium stearate
Alminum stearate
Zinc stearate
Calcium laurylate
Titanium dioxide
Barium stearate
(TOPANOL) 1,3,5, tris (2-methyl-4hydroxy-5-t-butyl phenol) butane

ANTI-STATIC AGENTS

Polyoxy alkyl amine

NYMEEN-S-210 (made by Nippon Oils and Fat Co., Ltd.) $C_{18}H_{37}N(CH_2CH_2O)(OH)_2$ Tertiary alkylamine; Molecular wt. 1135; Vis. 500 cps Alliphatic glycerine ester RESISTAT-PE-132 (made by Deiichi Kogyo Seiyaku Co., Ltd.) mono glyceride of $C_{17}H_{35}COOH$ $C_{17}H_{35}COOCH_2-CHOH-CH_2OH$ molecular weight 358
RESISTAT-PE-139 almost the same kind as above.

Alkyl phosphate

PHOSPHANOL-SM-1 (made by Toho Chemical Industries Co., Ltd.) $(RO(CH_2CH_2O)N)_3P$ R= alkyl with carbon number 18.
PHOSPHANOL-NP-10 The same substance as above except R= alkyl with carbon number 12.

Alkyl Betaine

LEOSTAT-532 (made by Lion Fat and Oil Co., Ltd.) $R((CH_2CH_2O)NH)_2N^+ CH_2COO^-$

DISPERSION AGENTS

Polyoxy ethylene alkyl ether

EMULGEN (made by KAO-ATLAS Co., Ltd.) $C_{18}H_{37}O(CH_2CH_2O)_nOH$ $n=$ 10 Molecular weight 710

Alkyl phospho esterate

OM-11 (made by Marubishi Petrochemical Co., Ltd.) $(RO)_2P(O)(OX)$ R= alkyl with carbon number 12–18. X= amine viscosity 500cps boiling point 330°C.

Polyoxy alkylamine

NYMEEN-T-210 (made by Nippon Oils and Fats Co., Ltd.) $R-N(CH_2CH_2O)(OH)_2$ R= unsaturated alkyl with carbon number approximately 10.

ANCHOR COATING AGENTS

Polyisocyanate

EL-250 (made by Toyo Ink Manufacturing Co., Ltd.) polyisocyanate that has R-NCO

Polytitanate

EL-110 (made by Toyo Ink Manufacturing Co., Ltd.)

TABLE I

COMPONENTS: BASE LAYER

| Ex. No. | Resin | Parts* | Filler | Parts | Stabilizer | Parts | Anti-static Agent | Parts | Dispersing Agent | Parts | Other Ingredients Parts |
|---|---|---|---|---|---|---|---|---|---|---|---|
| 1 | PP | 100 | clay | 5 | Ca-stearate TOPANOL | 0.3 0.1 | PHOSPHANOL SM-1 (Toho-Chem. Inc) | 0.1 | NYMEEN S-210 (Nippon Oil and Fat Co, Ltd.) | 0.1 | — |
| 2 | PP | 90 | k. | 10 | Ca-stearate TOPANOL | 1.0 0.1 | PHOSPHANOL SM-1 (Toho Chem. Inc) | 0.3 | NYMEEN S-210 (Nippon Oil & Fat Co. Ltd) | 0.3 | — |
| 3 | PE PP Polybutene-1 | 10 10 80 | clay clay | 5 25 | Al-stearate TOPANOL | 1.0 0.5 | LEOSTAT-532 (Lion Fat & Oil Co.) | 0.5 | EMULGEN (Kao Atlas Co.) | 0.6 | — |
| 4 | PE PP EVA(VA 12%) | 10 10 80 | clay | 3 | Zn-stearate TOPANOL Ca-stearate TOPANOL | 0.5 0.1 1.0 0.1 | LEOSTAT-532 (Lion Fat & Oil Co.) | 1.0 | EMULGEN (Kao Atlas Co.) | 0.5 | Antiultraviolet Agent 0.3 |
| 5 | PE EVA (VA 15%) | 80 20 | — | | | | | | — | | — |
| 6 | PP EPP(E 3%) | 90 10 | — | | Ca-laurate. TOPANOL | 0.5 0.5 | — | | EMULGEN (Kao Atlas Co.) | 0.5 | — |
| 7 | PP EPP | 90 10 | clay Ca-carbonate | 2 | Zn-stearate TOPANOL | 0.5 0.3 | — | | EMULGEN (Kao Atlas Co.) | 0.3 | — |
| 8 | PP (E 15%) | 90 10 | clay TiO$_2$ | 10 15 | Ca-stearate TOPANOL | 1.3 0.7 | — | | EMULGEN (Kao Atlas Co.) | 0.3 | — |
| 9 | EPP(E15%) PE | 100 | clay | 10 10 | TOPANOL | 0.1 | — | | EMULGEN (Kao Atlas Co.) | 0.3 | — |
| 10 | PVC PVC-(VC80%) | 80 | barium sulfate | 3 | Ba-stearate | 1.5 | — | | EMULGEN (Kao Atlas Co.) | 1.0 | — |
| 11 | PVDC PP | 20 80 | clay clay | 2 1 | — | | — | | — | | — |
| 12 | PE-terephthalate PP | 20 80 | Kieselguhr | 0.5 | — | | — | | NYMEEN S-210 (Nippon Oil & Fat Co.) | 0.1 | — |
| 13 | Polyamide (Nylon-6) | 20 | — | | Ca-stearate | 0.5 | — | | NYMEEN S-210 (Nippon Oil & Fat. Co.) | 0.1 | — |
| 14 | PP | 100 | — | | Ca-stearate | 0.5 | — | | — | | — |
| 15 | PS | 100 | — | | — | | — | | — | | — |
| 16 | PE | 100 | clay Kieselguhr | 1 | Ca-stearate TOPANOL | 0.5 0.5 | MYMEEN S-210 (Nippon Oil & Fat. Co.) | 0.5 | — | | — |
| 17 | HI/PS | 20 | clay | 2 | Al-stearate TOPANOL | 0.3 1.0 0.3 | RESISTAT PE 132 (Daiichi Kogyo Seiyaku) | 0.5 | — | | — |
| 18 | PE ABS (A10% B 20% and S 70%) | 80 20 | Kieselguhr | | | | | | — | | — |

Weight percent of filler or other components can be calculated by the following formula:

weight percent of filler = $\frac{\text{Filler Parts}}{\text{Total Parts of Resin, Filler and Additives}} \times 100$

*NB. All "parts" are "parts by weight"

TABLE II (a)
COMPONENTS: PAPER-LIKE LAYER

| Ex. No. | Resin | Parts* | Filler | Parts | Stabilizer | Parts |
|---|---|---|---|---|---|---|
| 1 | PP | 100 | clay | 15 | Ca-stearate | 0.5 |
|   |    |     | Kieselguhr |   | TOPANOL | 0.3 |
| 2 | PP | 80 | clay | 5 | Ca-stearate | 1.0 |
|   | PE | 20 |      |   | TOPANOL | 0.1 |
| 3 | PP | 80 | clay | 40 | Al-stearate | 0.5 |
|   | Polybutene-1 | 10 |   |   | TOPANOL | 0.5 |
|   | EVA(VA 10%) | 10 |   |   |   |   |
| 4 | PP | 80 | clay | 23 | Zn-stearate | 0.5 |
|   | EVA(VA12%) | 20 | Kieselguhr | 10 | TOPANOL | 1.0 |
| 5 | PVC | 100 | clay | 50 | Ca-stearate | 1.0 |
|   |     |     | Ca-carbonate | 80 | Ba-stearate | 1.0 |
| 6 | PP | 90 | clay | 70 | Ca-laurate | 0.5 |
|   | EPP(E 3%) | 10 | Kieselguhr | 40 | TOPANOL | 0.5 |
|   |           |    | $TiO_2$ | 20 |   |   |
| 7 | PP | 30 | clay | 10 | Zn-stearate | 0.3 |
|   | EPP(E 15%) | 70 | Ca-carbonate | 15 | TOPANOL | 0.3 |
| 8 | PE | 80 | clay | 100 | TOPANOL | 0.2 |
|   | EPP(E 15%) | 20 | Kieselguhr | 50 |   |   |
| 9 | EPP (E 20%) | 100 | clay | 33 | TOPANOL | 0.1 |

| Ex. No. | Anti-static Agent | Parts | Dispersing Agent | Parts | Others | Parts |
|---|---|---|---|---|---|---|
| 1 | PHOSPHANOL SM-1 (Toho Chemical Inc.) | 0.1 | NYMEEN S-210 (Nippon Oil & Fat Co.) | 0.7 | — |   |
| 2 | PHOSPHANOL SM-1 (Toho Chem. Inc.) | 0.3 | NYMEEN S-210 (Nippon Oil & Fat Co.) | 1.0 | — |   |
| 3 | PHOSPHANOL SM-1 (Toho Chem. Inc.) | 0.5 | NYMEEN S-210 (Nippon Oil & Fat Co.) | 1.0 | — |   |
| 4 | NYMEEN S-210 (Nippon Oil & Fat Co.) | 0.3 | NYMEEN S-210 (Nippon Oil & Fat Co.) | 0.3 | Antiultraviolet Agent | 0.3 |
| 5 | NYMEEN S-210 (Nippon Oil & Fat Co.) | 1.0 | NYMEEN S-210 (Nippon Oil & Fat Co.) | 0.5 | — |   |
| 6 | NYMEEN S-210 (Nippon Oil & Fat Co.) | 0.5 | EMULGEN (Kao Atlas Co.) | 0.5 | — |   |
| 7 | NYMEEN S-210 (Nippon Oil & Fat Co.) | 0.5 | EMULGEN (Kao Atlas Co.) | 0.5 | — |   |
| 8 | — |   | — |   | — |   |
| 9 | — |   | — |   | — |   |

TABLE II (b)
COMPONENTS: PAPER-LIKE LAYER

| Ex. No. | Resin | Parts* | Filler | Parts | Stabilizer | Parts |
|---|---|---|---|---|---|---|
| 10 | PVC | 100 | clay | 100 | Ba-stearate | 1.5 |
|    |     |     |      |     | Ca-stearate | 0.5 |
| 11 | PP | 80 | clay | 50 | — |   |
|    | PE-terephthalate | 20 |   |   |   |   |
| 12 | PP | 80 | clay | 80 | — |   |
|    | Polyamide (Nylon-6) | 20 |   |   |   |   |
| 13 | PP | 80 | clay | 80 | — |   |
|    | Polyamide (Nylon-6) | 20 | Magnesium Oxide | 20 |   |   |
| 14 | PP | 80 | clay | 70 | — |   |
|    | PS | 20 | Ca-carbonate | 30 |   |   |
| 15 | PS | 100 | clay | 90 | — |   |
|    |    |     | $TiO_2$ | 10 |   |   |
| 16 | PE | 80 | clay | 70 | — |   |
|    | PS | 20 | Barium sulfate | 10 |   |   |
| 17 | PE | 80 | clay | 80 | Ca-stearate | 0.7 |
|    | HI/PS | 20 | Kieselguhr | 30 | TOPANOL | 0.5 |
| 18 | PE | 80 | clay | 20 | Ca-stearate | 0.7 |
|    | ABS | 20 | Ca-carbonate | 15 | TOPANOL | 0.5 |

| Ex. No. | Anti-static Agent | Parts | Dispersing Agent | Parts | Others | Parts |
|---|---|---|---|---|---|---|
| 10 | — |   | — |   | — |   |
| 11 | RESISTAT PE 132 (Daiichi Kogyo Seiyaku) | 0.3 | NYMEEN S-210 (Nippon Oil & Fat Co.) | 0.1 | — |   |
| 12 | " | 0.7 | " | 0.5 | — |   |
| 13 | " | 0.7 | " | 0.5 | — |   |
| 14 | " | 0.7 | " | 0.5 | — |   |
| 15 | " | 0.7 | " | 0.5 | — |   |
| 16 | " | 0.7 | " | 0.5 | — |   |
| 17 | NYMEEN S-210 (Nippon Oil & Fat Co.) | 0.5 | — |   | — |   |
| 18 | NYMEEN S-210 | 0.5 | — |   | — |   |

-continued (Nippon Oil & Fat Co.)

*NB- "parts" are "parts by weight".

TABLE III

MANUFACTURING CONDITIONS

| | Base Layer | | PAPER-LIKE LAYER | | | | |
|---|---|---|---|---|---|---|---|
| | MD (Machine Direction) | stretching ratio (x) (times initial | Temperature | | | | Stretching Ratio |
| Ex. | C° | length) | laminating C° | pre-heating C° | stretching C° | setting C° | (x) |
| 1. | 150 | 5 | 260 | 160 | 160 | 140 | 8 |
| 2. | 140 | 2 | 300 | 160 | 150 | 140 | 5 |
| 3. | 140 | 4 | 250 | 160 | 150 | 130 | 7 |
| 4. | 140 | 6 | 250 | 150 | 145 | 130 | 6 |
| 5. | 130 | 1.3 | 130 | 150 | 140 | 120 | 4 |
| 6. | 140 | 5 | 280 | 165 | 145 | 140 | 5 |
| 7. | 140 | 5 | 280 | 160 | 150 | 140 | 8 |
| 8. | 150 | 4 | 280 | 160 | 150 | 140 | 7 |
| 9. | 135 | 3 | 250 | 160 | 150 | 140 | 2.5 |
| 10. | 100 | 5 | 130 | 110 | 100 | 85 | 6 |
| 11. | 145 | 4 | 280 | 165 | 160 | 140 | 5 |
| 12. | 145 | 5 | 250 | 165 | 160 | 140 | 7 |
| 13. | 140 | 5 | 250 | 160 | 150 | 140 | 8 |
| 14. | 140 | 6 | 250 | 160 | 150 | 140 | 7 |
| 15. | 100 | 4 | 200 | 120 | 110 | 90 | 6.5 |
| 16. | 135 | 6 | 220 | 140 | 130 | 130 | 5 |
| 17. | 135 | 7 | 250 | 140 | 130 | 130 | 8 |
| 18. | 135 | 5 | 250 | 140 | 130 | 130 | 4 |

Note -
The transverse stretching speed in a transverse direction in the above manufacturing conditions was at a speed of 3000 percent per minute. The stretching speed in a transverse direction may generally be in a range of 2000 percent to about 10,000 percent per minute.

TABLE IV

THICKNESS OF ARTICLE

| Ex. | BASE LAYER (microns) | PAPER-LIKE LAYER (microns) |
|---|---|---|
| 1. | 40 | 40 |
| 2. | 50 | 60 |
| 3. | 30 | 10 |
| 4. | 20 | 10 |
| 5. | 30 | 30 |
| 6. | 60 | 20 |
| 7. | 70 | 40 |
| 8. | 30 | 50 |
| 9. | 80 | 60 |
| 10. | 50 | 20 |
| 11. | 20 | 100 |
| 12. | 40 | 50 |
| 13. | 20 | 20 |
| 14. | 20 | 10 |
| 15. | 80 | 70 |
| 16. | 40 | 80 |
| 17. | 40 | 100 |
| 18. | 50 | 30 |

TABLE V

PROPERTIES

| Ex. | OPACITY (%) | TENSILE STRENGTH MD/TD (kg.) | SPECIFIC GRAVITY | INK TRANS FER (g/m²) | INK ADHESION | TEAR STRENGTH MD/TD (kg/cm) | FOLDING ENDURANCE (cycles) |
|---|---|---|---|---|---|---|---|
| 1. | 55 | 9.6/17.6 | 0.78 | 2.1 | Δ | 70/60 | >150,000 |
| 2. | 38 | 12.5/24.5 | 0.85 | 1.2 | Δ | 108/98 | >150,000 |
| 3. | 38 | 5.6/9.6 | 0.81 | 3.0 | O | 65/58 | >150,000 |
| 4. | 35 | 3.7/7.3 | 0.75 | 3.0 | O | 46/43 | >150,000 |
| 5. | 60 | 7.2/14.4 | 0.68 | 3.2 | O | 66/59 | >150,000 |
| 6. | 89 | 9.6/17.2 | 0.72 | 3.2 | O | 108/100 | >150,000 |
| 7. | 57 | 13.0/26.2 | 0.77 | 2.1 | Δ | 120/110 | >150,000 |
| 8. | 90 | 13.1/25.6 | 0.71 | 3.4 | O | 70/62 | >150,000 |
| 9. | 91 | 10.1/23.1 | 0.78 | 3.1 | O | 120/105 | >150,000 |
| 10. | 88 | 8.4/19.2 | 0.72 | 3.2 | O | 105/95 | >150,000 |
| 11. | 93 | 14.2/25.0 | 0.72 | 3.1 | O | 25/22 | >150,000 |
| 12. | 92 | 10.2/20.0 | 0.73 | 3.1 | O | 50/45 | >150,000 |
| 13. | 48 | 5.8/9.6 | 0.69 | 3.0 | O | 21/19 | >150,000 |
| 14. | 40 | 4.2/8.2 | 0.73 | 3.1 | O | 20/18 | >150,000 |
| 15. | 92 | 7.2/15.6 | 0.81 | 2.9 | O | 85/70 | >150,000 |
| 16. | 90 | 11.5/23.2 | 0.78 | 2.8 | O | 60/52 | >150,000 |
| 17. | 94 | 10.5/21.3 | 0.79 | 3.1 | O | 50/40 | >150,000 |
| 18. | 87 | 9.7/17.6 | 0.85 | 2.9 | O | 70/50 | >150,000 |
| Natural Cellulose Paper | 85~90 | 8.9/5.4 | 0.8~1.2 | 2.3~3.5 | 0 | 28/26 | 1000 |

MD - Machine Direction
TD - Transverse Direction
~ - symbol for "approximately"
O - good
Δ - fair

TABLE VI
FILLER EFFECT IN BASE LAYER*

| Filler Content (wt. %) | Stretching Stability (without splitting) | Tear Strength (after stretching) | Opacity | Whiteness |
|---|---|---|---|---|
| 0 | good | good | opacity increases as filler content increases ↓ good | whiteness increases as filler content increases ↓ good |
| 10 | good | good | | |
| 20 | good | good | | |
| 25 | inferior (film split) | inferior | | |
| 30 | poor (film split) | poor | | |

*Resin = PP
Filler = Kaolinite clay

TABLE VII (a)
EFFECT OF FILLER CONTENT IN PAPER-LIKE LAYER

| | | Properties-A | | | | Properties-B | | |
|---|---|---|---|---|---|---|---|---|
| Ex. (Resin=PP) | Filler Content (wt.%) | Hardening time of ink(min.) | Ink adhesion | Ink transfer(g/m$^2$) | Opacity (%) | Gloss (%) | Surface intensity (IGT cm/sec) | Smoothness (Beck sec) |
| 1. | 0.5 | 1000 | Δ~x | 0.8 | 7 | 60 | 360 | 3000 |
| 2. | 5 | 820 | Δ | 1.2 | 38 | 45 | 360 | 1700 |
| 3. | 20 | 240 | O | 2.8 | 88 | 36 | 290 | 1200 |
| 4. | 25 | 200 | O | 2.9 | 89 | 35 | 280 | 1150 |
| 5. | 30 | 180 | O | 3.0 | 90 | 34 | 270 | 1120 |
| 6. | 60 | 95 | O | 3.4 | 94 | 22 | 200 | 800 |
| 7. | 65 | 80 | O | 3.5 | 95 | 20 | 130 | 500 |
| 8. | 70 | 70 | O | 3.5 | 95 | 15 | 55 | 100 |
| Natural Cellulose Paper | | 50~250 | 0 | 2.5~3.5 | 3~40 | 100~200 | 100~1000 | |

Properties A = Improve as filler content increases
Properties B = Decrease as filler content increases
Beck sec = The higher in value indicates improved smoothness
Δ = Fair
X = Inferior
O = Good
Resin = PP
Filler = Kaolinite clay

TABLE VII (b)
EFFECT OF FILLER CONTENT IN PAPER-LIKE LAYER ON VOID FORMATION

| | | | | Properties-A | | | | Properties-B | | |
|---|---|---|---|---|---|---|---|---|---|---|
| Ex. | Void proportion* in paper-like layer(%) | Filler content (wt%) | Stretching extent(x) times | Hardening time of ink (min) | Ink adhesion | Ink transfer(g/m$^2$) | Opacity (%) | Gloss (%) | Surface intensity (IGT) cm/sec | Smoothness (Beck cm/sec) |
| 9.1 | 5 | 5 | 8 | 820 | Δ | 1.2 | 38 | 45 | 360 | 1700 |
| 10. | 10 | 20 | 4 | 300 | Δ | 2.1 | 57 | 42 | 360 | 1500 |
| 11. | 15 | 20 | 5 | 250 | O | 2.8 | 88 | 38 | 300 | 1250 |
| 12. | 20 | 25 | 5 | 200 | O | 2.8 | 89 | 36 | 290 | 1200 |
| 13. | 30 | 35 | 8 | 170 | O | 3.0 | 92 | 34 | 270 | 1120 |
| 14. | 59 | 60 | 12 | 95 | 0 | 3.4 | 94 | 24 | 210 | 1000 |
| 15. | 60 | 63 | 9 | 90 | O | 3.4 | 95 | 22 | 200 | 800 |
| 16. | 65 | 65 | 15 | 80 | O | 3.5 | 95 | 20 | 130 | 500 |
| 17. | 70 | 70 | 15 | 70 | O | 3.5 | 95 | 15 | 55 | 100 |
| Natural Cellulose Paper | | | | 50~270 | 0 | 2.3~3.5 | 85~90 | 3~40 | 100~200 | 100~1000 |

*Void Proportion of Paper-like layer is as follows:

$$V(\%) = \frac{Po - P}{Po} \times 100$$

where V: Void Proportion
Po : Initial Density of paper-like layer
P: Density of paper-like layer after stretching Δ = Fair
O = Good
Resin = PR
Filler = Kaolinite clay and Kieselguhr where ratio $= \frac{KC}{K} = \frac{4}{1}$ In the tables above if the tables with a numeral and a letter are placed one above the other in proper sequence of the examples listed therein and in a descended order from left to right, an overall view of the components, manufacturing conditions and resulting characteristics of the manufactured papers will be readily seen.

The tables VII (a) and VII (b) indicate the effect of filler on various properties of the synthetic paper and provide a comparison with natural cellulose paper. As can be seen from the tables, the synthetic paper according to the invention has improved qualities over paper made from natural pulp.

The synthetic papers according to the invention are suitable for use as high grade printing paper, for cards, maps, charts, decorative papers, dull finished or mat papers, typing, duplicating, drafting, tracing, writing, drawing, packaging, wrapping, paper boards and the like.

Figure 8:
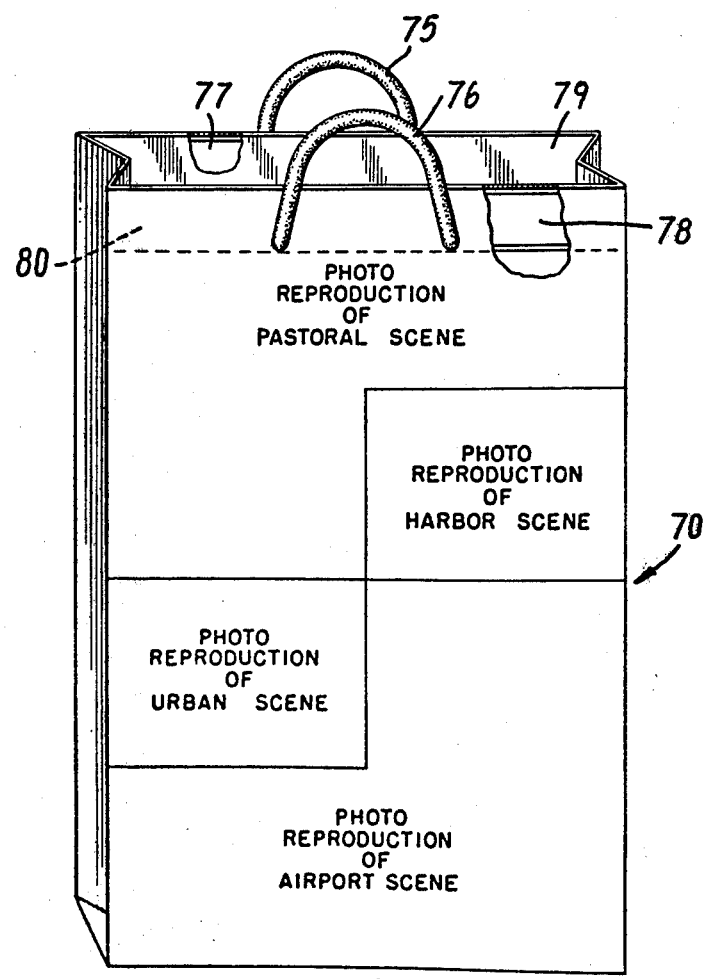
FIG. 8 is a perspective view of a bag made of synthetic paper according to the invention.

The synthetic paper made according to the invention provides a paper with sufficient toughness and strength to be used for making bags as shown in FIG. 8 in which a shopping bag 70 is made out of a single sheet of synthetic paper. The sheet is folded in a conventional manner and made into the bag. The longitudinal seam along the length of the bag and folds forming the bottom of the bag are bonded by use of an adhesive or bonding agent. Bonding can be effected by heat seals or "welds". When heat seals or bonds are effected suitable pressures, times and temperatures and current values are used as is well known in this art. The bag is provided with handles 75,76 made, for example, of synthetic filaments anchored to the bag by strips 77,78 of rigid material, for example paper or cardboard, underlying folds 79,80 at the mouth of the bag.

Figure 9:
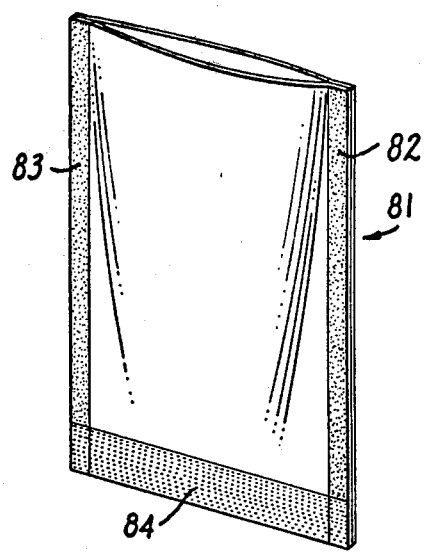
FIG. 9 is a perspective view of an envelope made of synthetic paper according to the invention.

Not only is the synthetic paper very strong and adequate for this use but the exterior of the bags may be decorated more clearly with colored printed pictures than when using only conventional printing paper. Thus the pictures are those of a city and mountain scenes and planes, etc., as desired. The possibility of using heat for forming bonds makes it possible to manufacture envelopes 81 as shown in FIG. 9 in which all of the cutting, folding and bonding at the seams 82,83,84 are accomplished automatically by heat sealing. Moreover the bonding or seaming may be accomplished by using vibrations to effect the bonds in making this type of product. The envelope can be decorated as desired.

In effecting heat seals electrically heated bars are used, for example. The heat seals are effected in two to three seconds at a pressure of about 2 kg/cm$^2$ at a temperature from about 200° to about 220°C. The current pulses are applied to the bars at a rate of about 0.2 seconds to about one second with a current value from about 20 to 30 amperes. The strength of the heat seals increases from about one second of application of heat to about two seconds and longer application of heat does not improve the strength of the seal materially.

Ultrasonic heat sealing is accomplished in about two to three seconds when the vibratory cycle is about 28 Kc. Furthermore heat sealing by using induction or resistance heating of the sealing elements is possible.

Figure 10:
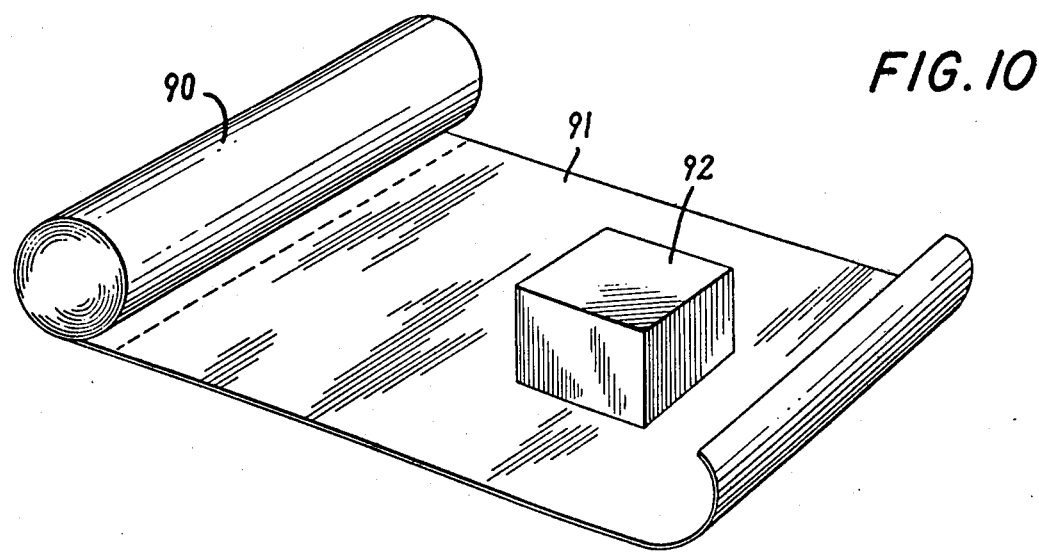
FIG. 10 is a perspective view of wrapper paper made of synthetic paper according to the invention.

The synthetic paper can be used as packaging and wrapping paper. FIG. 10 illustrates a roll 90 of synthetic paper 91 made according to the invention for wrapping an item 92. Those skilled in the art will understand that the item 92 can be a box or package to be wrapped or can be an article of food, or any article or articles such as a stack of cards or papers to be wrapped, for example automatically. The synthetic paper 91 can likewise be decorated as desired.

As indicated heretofore a particular advantage of the paper-like laminate according to the invention is that it is waterproof and can be folded and unfolded thousands of times without failure or rupture. This feature makes it possible to make maps and charts having a long life when subjected to moisture and folding and unfolding. The waterproof characteristics of the synthetic paper of the invention improve its use as a wall covering.

Figure 11:
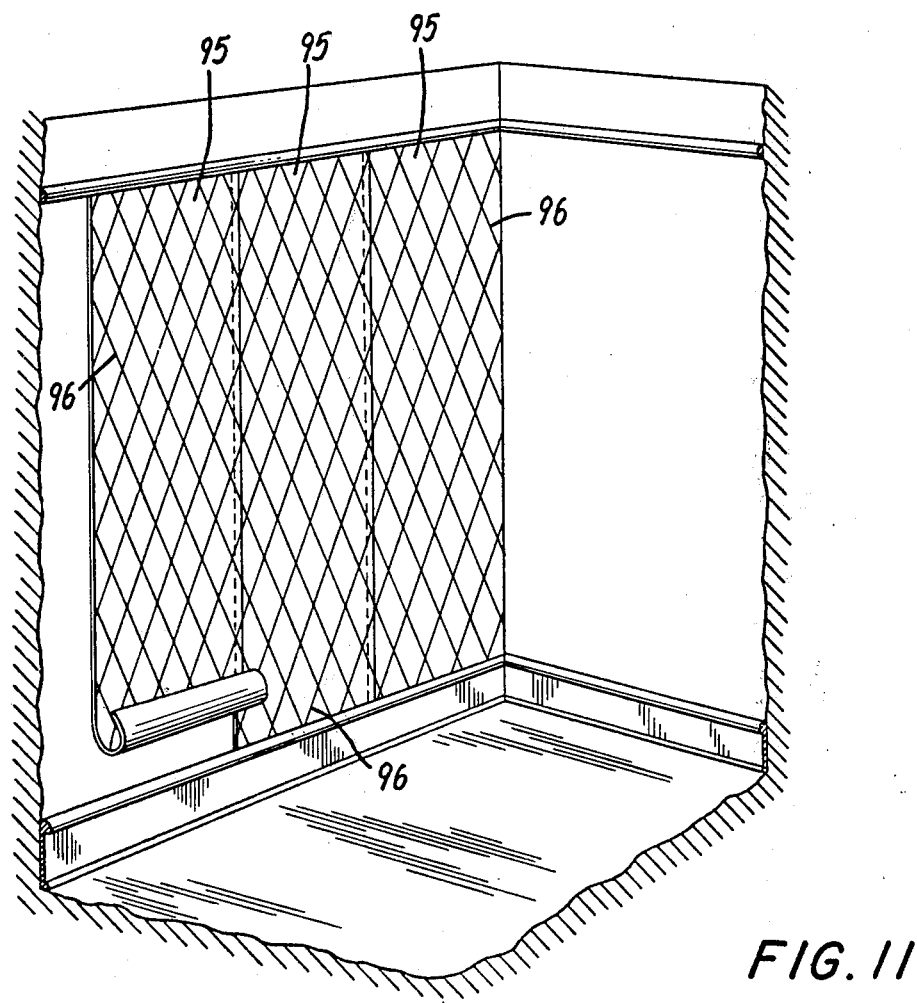
FIG. 11 is a plan view of an embossed wallpaper made of synthetic paper according to the invention.

The synthetic paper can be used to make wallpaper 95 illustrated in FIG. 11. The wallpaper may be embossed as illustrated at 96 or may have any desired decorations, including printing, thereon.

Those skilled in the art will understand that laminates formed (18 examples) according to Table I(a) through Table IV have properties as set forth in Table V which are generally superior to those of natural cellulose paper. Some effects of filler on a PP base layer can be seen from Table VI. It can be seen from the latter table that in order to maintain good mechanical strength in the base layer the filler preferably should not exceed 20% by weight of the base layer composition.

The properties of PP compositions (17 examples) with filler therein as noted are set forth in Tables VII(a) and VII(b) and the properties designated A and B are generally superior to natural cellulose paper.

Those skilled in the art will recognize that microvoid formation is essential to the paper-like layer of the present invention and these microvoids are elongated and formed in dependence upon the extent of stretching and the size of the particles of the filler whose diameter principally determines the major width dimension of the voids. The number of microvoids developed is principally controlled by the percentage, by weight, of filler in the paper-like layer compositions. The length of the voids is essentially controlled by the extent of the stretching and this is designated $(x)$ in the various tables.

Thus the paper-like layers of the various laminates disclosed are fibrous internally and are able to have images printed thereon and accept various inks and can be written on by various instruments.

The synthetic paper according to the invention has excellent tear and burst strength and the heat seals or bonding of seams likewise are of great strength. Hot wet adhesives or any type of suitable adhesive can likewise be used to make suitable bonds.

It can be seen that the principal constituents in the paper are the resins and the filler components. The stabilizers are only from about 0.1% to 2% by weight; the antistatic agents are about 0.1% to about 0.5% by weight; the latter value is true for the dispersion agents and the anti-ultraviolet degradation agents. The synthetic paper according to the invention can be made without the additional components, those other than the principal components, listed above.

While preferred embodiments of the invention have been shown and described it will be understood that many modifications and changes can be made within the true spirit and scope of the invention.

What we claim and desire to secure by letters patent is:

1. A method of producing a synthetic paper-like laminate comprising, providing a base film layer made of a thermoplastic resin, uniaxially orienting the base film layer, laminating on said base film layer a paper-like film layer made of a thermoplastic resin having more than 25% and no more than 65% by weight of particles of a fine inorganic filler substantially uniformly distributed therein thereby to form a laminate, the weight percentage of said inorganic filler being dependent on the weight of the resin plus the filler, stretching while in a heated state the laminate in a transverse direction to biaxially orient the base film layer and uniaxially orient the paper-like film layer including stretching the laminate in the transverse direction from 7 to 16 times greater than the original transverse dimension of said films in the last-mentioned direction to develop microvoids having a void proportion of from 10% to 65% in said paper-like film layer in conjunction with said particles of filler distributed internally in the paper-like layer as comminicating and independent microvoids to develop fibrous-like portions of the resin thereof among the microvoids interiorly of said paper-like film layer to define therein a cellular, fibrous structure, said stretching including developing of microvoids open to the surface of said paper-like film layer free of said base film layer and distributed throughout said surface, ceasing said stretching, and setting said resin after stretching maintaining the internal microvoids including the last-mentioned microvoids open to said surface upon cessation of said stretching.

2. A method of producing a synthetic paper-like laminate according to claim 1, including applying an electrostatic charge to said synthetic laminate to render said paper-like layer more attractive to ink.

3. A method of producing a synthetic paper-like laminate according to claim 1, in which said base film layer is extruded, cooled immediately afterward and stretched while in a heated state in a longitudinal direction to orient the resin thereof.

4. A method of producing a synthetic paper-like laminate according to claim 1, in which said laminate is preheated and then stretched transversely to biaxially orient the base film layer and uniaxially orient the paper-like film layer.

* * * * *